1,446,272

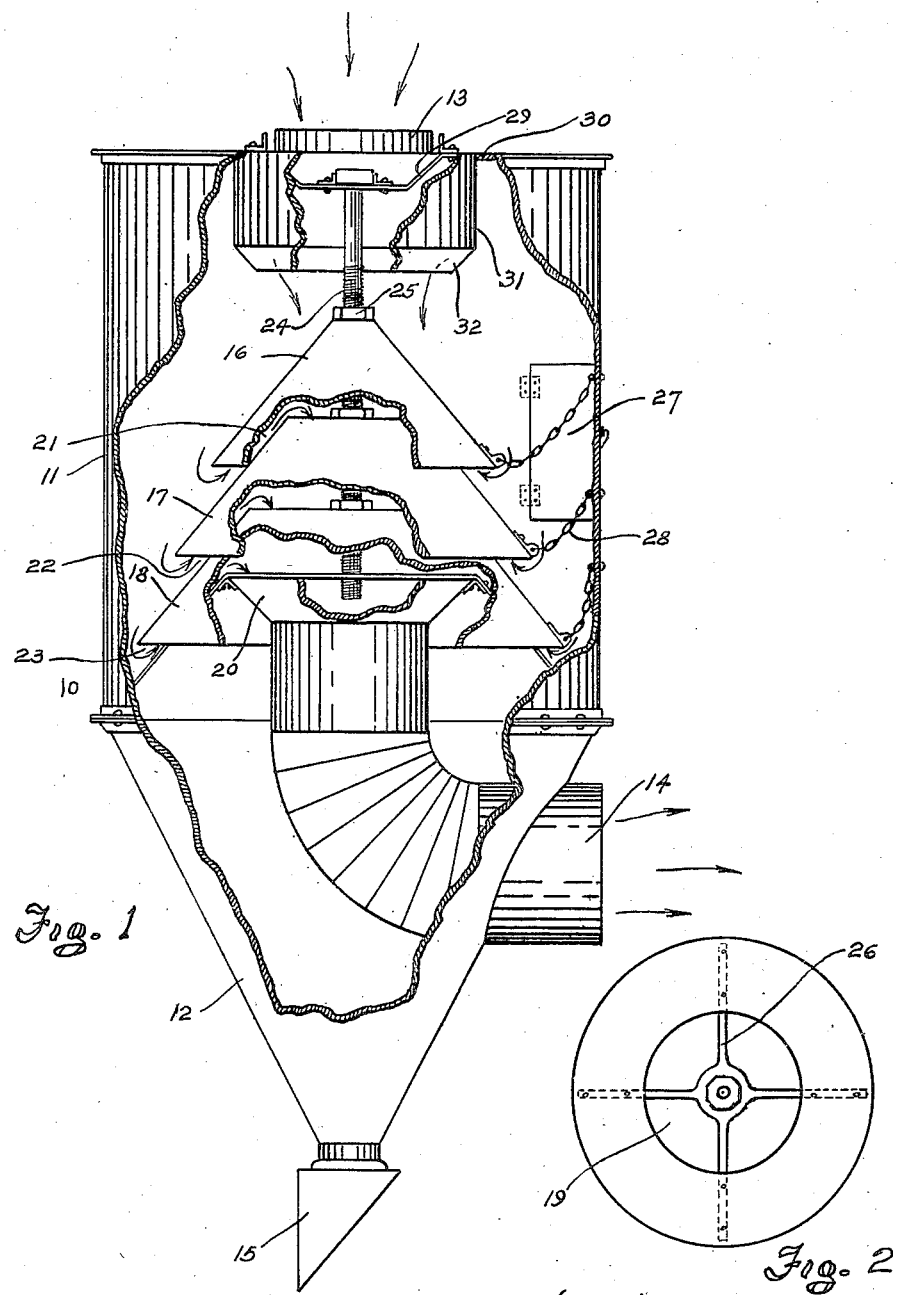
Feb. 20, 1923.     W. B. PROUTY.     1,446,272.
CASCADE DUST TRAP.
FILED JULY 16, 1921.
Inventor
William B. Prouty
By Gillson & Gillson
Attorneys Patented Feb. 20, 1923.

UNITED STATES PATENT OFFICE.

WILLIAM B. PROUTY, OF EVANSTON, ILLINOIS.

CASCADE DUST TRAP.

Application filed July 16, 1921. Serial No. 485,361.

*To all whom it may concern:*

Be it known that I, WILLIAM B. PROUTY, a citizen of the United States, and resident of Evanston, county of Cook, and State of Illinois, have invented certain new and useful Improvements in Cascade Dust Traps, of which the following is a specification, and which are illustrated in the accompanying drawings forming a part thereof.

The invention relates to dust separators and has as its object a device of this nature which will separate the coarse dust particles from the fine, allowing the fine particles to be carried through the device by air currents. A further object of the invention is to provide means for obtaining the proper adjustment of parts of the separator to secure the separation of coarse and fine particles in accordance with the grading desired.

An illustrative embodiment of the invention is shown in the accompanying drawing in which;

Fig. 1 is a side elevation of the improved dust separator, parts being broken away to show the interior structure, and Fig. 2 is a top plan view of a detail of the apparatus separated from other parts and drawn upon a smaller scale.

The casing or shell 10 of the improved dust separator preferably comprises an upper cylindrical section 11, and a lower conical section 12. As shown, the cylindrical section 11 serves as a housing for containing the parts employed for separating the coarse from the fine particles, and the conical section 12 serves as a hopper in which the coarse particles are collected. The air stream charged with the dust to be treated enters the housing 11 centrally at the top where the flange 13 of an intake opening appears upon the drawing, the said flange serving to receive the end of a conduit (not shown) leading from a grinding mill or the like. The air currents carrying the fine dust from which the coarse particles have been separated are delivered laterally as through a conduit 14 which projects through the side wall of hopper section 12. A trap, conventionally represented at 15, is provided at the bottom of the hopper for permitting the discharge of the coarse particles without admission of air in a well known manner. When it is desired to have the finished product composed entirely of fine particles the material discharged from the trap 15 may be returned to the grinding mill or the like.

The reduction in velocity of the air stream resulting from its entry into the relatively large chamber of the cylindrical section 11 of the casing is relied upon to secure precipitation of the coarse dust particles, while separation of the fine particles which may be precipitated with them is insured by cascading the precipitated particles from one to another of a series of cones, as 16, 17 and 18, and passing the air current through the shower of particles between the cones. Since the shower of particles falls from the perimeter of each cone at its largest diameter, a wide distribution of the shower of particles is obtained without requiring that the apparatus should be made of undue size.

In the preferred arrangement of the apparatus, the several cones 16, 17, 18 are of different sizes, the smallest cone 16 being the highest and being closed at the top while each of the remaining cones 17, 18, has a central opening, as 19, (Fig. 2). Likewise, the inner end of the conduit 14 is turned upwardly and is preferably formed with a flaring or hopper mouth 20 over which the largest cone 18 is suspended, the mouth 20 of the conduit being of larger diameter than the central opening 19 of the cone.

The degree of fineness of the dust particles which will be carried out through the conduit 14 will depend upon the velocity of the air currents entering the spaces 21, 22, between the several cones and the space 23 between the lowest cone 18 and the rim of the hopper mouth 20 of the conduit 14. This is for the reason that it is these air currents which cross the showers of particles which fall from the edges of the cones.

In order that the air spaces 21, 22, and 23 may be adjustable in width, the several cones 16, 17, 18, are desirably suspended for vertical adjustment. As shown, all of the cones are hung upon a common upright bolt 24 and each of the cones has threaded engagement with this bolt. Since no central opening for the passage of air through the upper cone 16 is required, the bolt 24 is threaded directly into this cone, as at 25. On the other hand, a spider frame 26 is fitted in the central opening 19 of each of the other cones 17, 18, and these spider frames have threaded engagement with the bolt 24.

Vertical adjustment of the cones 16, 17

18 is accomplished by rotating the cones upon the bolt 24. Access to the cones for this purpose may be had through a door 27 provided in the side wall of the cylindrical part 11 of the casing 10. Usually the cone 18 will be adjusted first to provide the desired width of opening 23 between the underside of this cone and the rim of the hopper mouth 20 of the conduit 14. The cones 17, 16, will be adjusted next in order to provide the desired width of openings 22 and 21 between the cones 17, 18 and 16, 17. Should a screen analysis of the material carried out with the air current through the conduit 14 show that this material contains larger particles than are desired in the finished product, the cones 16, 17, 18 may be readjusted to increase the width of the opening 21, 22, 23. Normally the adjustment of the cones is maintained by holding them against rotation on the bolt 24. For this purpose the cones may be connected to the side wall of the casing 10 by chains, as 28. Preferably the chains 28 are so positioned as to be accessible through the door 27 to permit of their being released by unhooking them from the cones when the cones are to be adjusted.

A firm support is provided for the bolt 24 by securing a truss frame 29 to the cover plate 30 of the casing 10 upon the inside of the same and the bolt 24 is hung in this frame. To insure that all of the material precipitated from the air current as it enters the chamber of the casing will be directed upon the surface of the upper cone 16 a hood 31 is fitted to the underside of the cover plate of the casing about the inlet opening. While this hood is shown as being of smaller diameter than the larger end of the cone 16, the effectiveness of the hood in directing material onto the surface of the cone is preferably increased by providing the hood with an inturned flange 32 at its lower end.

I claim as my invention:—

1. A dust separator, comprising in combination, a housing having an inlet opening for dust laden air, an air outlet opening, and a dust discharge valve, a threaded shaft depending from the said housing beneath said inlet opening, and a plurality of dust separating elements between the inlet opening and air outlet opening threadedly engaging the shaft and adjustable thereon.

2. A dust separator comprising, in combination, a housing having at its upper portion a restricted inlet opening for dust laden air, an air outlet at its lower portion, a threaded shaft depending from said housing beneath said inlet opening, and a plurality of superposed conical members located in the passageway between said inlet and outlet members threaded by engaging the shaft and adjustable thereon.

3. A dust separator comprising, in combination, a housing having an upper cylindrical section and a lower conical section, an inlet opening for dust laden air in said upper section, a threaded shaft depending from said housing beneath said inlet opening, a plurality of superposed dust separating elements suspended below said opening, threadedly engaging said shaft and adjustable thereon, a discharge pipe opening into the lower of said elements and discharging through the side of the lower section and a dust outlet at the bottom of the lower section.

4. A dust separator comprising, in combination, a housing having an inlet opening for dust laden air at the top thereof, an air discharge pipe at its lower portion, a threaded shaft depending from said housing beneath said inlet opening and a plurality of superposed conical dust separating elements threadedly engaging the shaft, the lowest one overlying said discharge pipe.

5. A dust separator comprising, in combination, a housing having an inlet opening for dust laden air at the top thereof, an air outlet pipe discharging through the lower portion thereof, a dust valve at the bottom of the housing, a shaft depending from said housing beneath said inlet opening, and a plurality of adjustable conical dust separating elements threadedly engaging the shaft, the lowest one overlying said discharge pipe, and means for securing said elements in adjusted position.

WILLIAM B. PROUTY.